United States Patent [19]

Ringe et al.

[11] 4,227,757

[45] Oct. 14, 1980

[54] SAFE FOR STORAGE OF PAPER MONEY AND OTHER VALUABLES

[75] Inventors: Werner Ringe, Geesthacht; Harry David, Hamburg, both of Fed. Rep. of Germany

[73] Assignee: Hauni-Werke Körber & Co. KG, Hamburg, Fed. Rep. of Germany

[21] Appl. No.: 6,218

[22] Filed: Jan. 24, 1979

[30] Foreign Application Priority Data

Feb. 8, 1978 [DE] Fed. Rep. of Germany ....... 2805252

[51] Int. Cl.[3] .......................... E05G 1/00; B65G 19/00

[52] U.S. Cl. ...................................... 312/97; 312/223; 312/268; 109/47

[58] Field of Search .................. 312/97, 97.1, 42, 267, 312/268, 269, 134, 135, 223, 186, 305; 109/47, 48, 6, 7

[56] References Cited

U.S. PATENT DOCUMENTS

| | | | |
|---|---|---|---|
| 1,717,926 | 6/1929 | Horowitz | 312/42 |
| 1,949,954 | 3/1934 | Culler et al. | 109/47 |
| 2,079,824 | 5/1937 | Smeaton et al. | 109/7 |
| 2,081,271 | 5/1937 | Ellithorpe | 109/7 |
| 2,816,000 | 12/1957 | Scholfield et al. | 312/268 |
| 3,297,139 | 1/1967 | Speigle | 312/268 |
| 3,345,117 | 10/1967 | Goldammer et al. | 312/223 |
| 3,413,934 | 12/1968 | DiGiacobbe, Jr. | 109/6 |
| 3,578,832 | 5/1971 | Toms | 312/268 |
| 3,589,785 | 6/1971 | Appleby | 312/268 |
| 3,883,203 | 5/1975 | Lexe | 312/268 |

FOREIGN PATENT DOCUMENTS

| | | | |
|---|---|---|---|
| 1128326 | 4/1962 | Fed. Rep. of Germany | 312/268 |

*Primary Examiner*—Victor N. Sakran
*Attorney, Agent, or Firm*—Peter K. Kontler

[57] ABSTRACT

A safe for storage of paper money of different denominations has an armored housing whose top wall has a row of openings. The housing confines several indexible conveyors, one for each opening and each having a stack of drawers for storage of bills of a particular denomination. A drawer of each conveyor is held in register with the respective opening. When the drawer which registers with the corresponding opening is empty or contains a small number of bills, the teller actuates a starting switch to index the respective conveyor with a preselected delay which cannot be altered by the teller whereby the conveyor lifts a filled drawer into register with the associated opening. The delay for indexing of each conveyor can be selected independently of the other conveyors. A second starting switch is actuated by the teller to index the respective conveyor in the opposite direction, without delay, whereby the conveyor moves a filled drawer into the interior of the housing.

21 Claims, 4 Drawing Figures

SAFE FOR STORAGE OF PAPER MONEY AND OTHER VALUABLES

BACKGROUND OF THE INVENTION

The present invention relates to safes in general, and more particularly to improvements in repositories for temporary or permanent storage of valuables, for example, paper money. Still more particularly, the invention relates to improvements in repositories or safes of the type wherein drawers for storage of notes or bills of various denominations, jewels, watches or the like can be conveyed into register with openings in a reinforced casing or housing so as to be readily accessible for insertion or removal of valuables.

The term "safe" is intended to designate stationary or mobile repositories for storage of valuables, especially notes or bills in banks and similar institutions wherein cashiers, tellers or other agents accept bills from customers or employees and/or hand out bills in payment for goods or services or in exchange for checks. As the number of bank robberies and of robberies of other money collecting or paying agencies increases, such institutions are compelled to undertake extensive precautionary measures, not only to prevent robberies and/or to reduce the amounts which can be appropriated by criminals in the course of a robbery, but also to protect the employees from bodily harm or metal anguish in the course of a robbery. Thus, it does not suffice to merely insure that the money which is manipulated by tellers in a bank or by employees in other institutions which handle large amounts of currency is adequately protected by being kept out of reach of robbers, for example, by confining the tellers in bulletproof and hermetically sealed cages. In fact, the laws of certain countries provide that the cages of tellers must be rendered bulletproof and should not be accessible from the outside when the institution is open to the public. A robber is likely to threaten one or more customers and/or employees with bodily harm and thereby induces the tellers to hand out large sums of money in exchange for release of the hostages. In other words, the perpetrators often get away with large hauls in spite of the fact that they cannot gain direct access to the safe or safes.

German Auslegeschrift No. 1,128,326 discloses a safe embodying a conveyor which can be started by closing a switch. The switch is actuatable by a key which can be manipulated to set the conveyor in motion, i.e., to move a money-containing drawer or tray within reach of an authorized employee, or to block the operation of the conveyor and to simultaneously trigger an alarm system. A drawback of such proposal is that the mode of manipulating the key is up to the employee. Thus, a frightened employee who fears for his or her own life, or is afraid that the robbers will inflict bodily harm to the hostages, will decide (or is likely to decide) to actuate the conveyor so as to gain access to and to hand over a substantial sum of money to the perpetrators. In fact, a frightened employee is likely to empty the entire safe in order to placate the robbers and to induce them to leave the premises. Moreover, if a teller conspires with the robbers, he or she is likely to empty the safe in the course of a robbery and to explain his or her action with alleged fear for his or her life and/or with fear for the life or lives of the hostage(s).

OBJECTS AND SUMMARY OF THE INVENTION

An object of the invention is to provide a safe which is constructed and assembled in such a way that even an authorized employee is unable to gain access to the entire contents of the safe within a relatively short interval of time, namely, within an interval which is expected to elapse during a bank robbery or during the perpetration of a similar crime.

Another object of the invention is to provide a safe which is likely to deter a would-be perpetrator from attempting a robbery because, if the would-be perpetrator is familiar with the nature of the safe, he is apprised of the fact that a teller (even a very frightened teller or a teller who conspires with the perpetrator) cannot hand over substantial sums of money within a reasonably short interval of time.

A further object of the invention is to provide a safe which not only provides a secure repository for valuables, especially notes, bills, checks or other forms of currency, but also assures the owners of the institution in which the safe is put to use that the employees cannot hand out substantial sums of money under circumstances including bank holdups and similar crimes.

An additional object of the invention is to provide a safe which, in spite of its aforedescribed design, fully meets the requirements of a bank or a similar institution as regards rapid completion of normal transactions which are anticipated in the course of regular business.

The invention is embodied in a safe for storage of paper currency or the like. The safe comprises an armored housing or casing which has at least one opening, for example, in the top portion of the housing. An indexible conveyor which is mounted in the housing includes or is operatively connected with a plurality of receptacles (e.g., drawers) for storage of currency therein. One of the receptacles is accessible via opening in the housing during each interval of dwell of the conveyor between successive indexing movements so that a teller or another authorized person can insert into or remove bills from the accessible receptacle. The means for indexing the conveyor at the will of the operator includes a starting switch which is actuated when the operator desires the conveyor to move a currency-containing receptacle into register with the opening. In accordance with a feature of the invention, the safe further comprises blocking means (e.g., a transmission such as a self-locking worm drive) which normally prevents indexing movements of the conveyor, and time-delay means (e.g., an adjustable timer clock) for deactivating the blocking means with a preselected delay (the extent or duration of the delay is preferably selected in dependency on the denominations of bills in the receptacles) following the actuation of the starting switch. The blocking means may be interposed between the prime mover (e.g., a reversible electric motor) of the conveyor and a means (e.g., an endless flexible element, particularly a chain) for moving the receptacles when the prime mover is set in motion.

The safe preferably further comprises means for automatically arresting the prime mover (and for thus again activating the blocking means) when the conveyor has moved its receptacles through a predetermined distance, i.e., in response to a predetermined incremental advance of the conveyor. If the receptacles form a stack of superimposed receptacles, the incremental advances of the conveyor are preferably selected in such a way that the second of two neighboring receptacles (the first of which was held in a position of register with the opening) moves into register with the opening after elapse of the preselected delay following the actuation of the starting switch.

The housing may be provided with several openings and then contains several conveyors, one for each opening and each having receptacles for bills of different or identical denominations. The outlines of the openings are preferably complementary to the outlines of receptacles on the respective conveyors.

The novel features which are considered as characteristic of the invention are set forth in particular in the appended claims. The improved safe itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
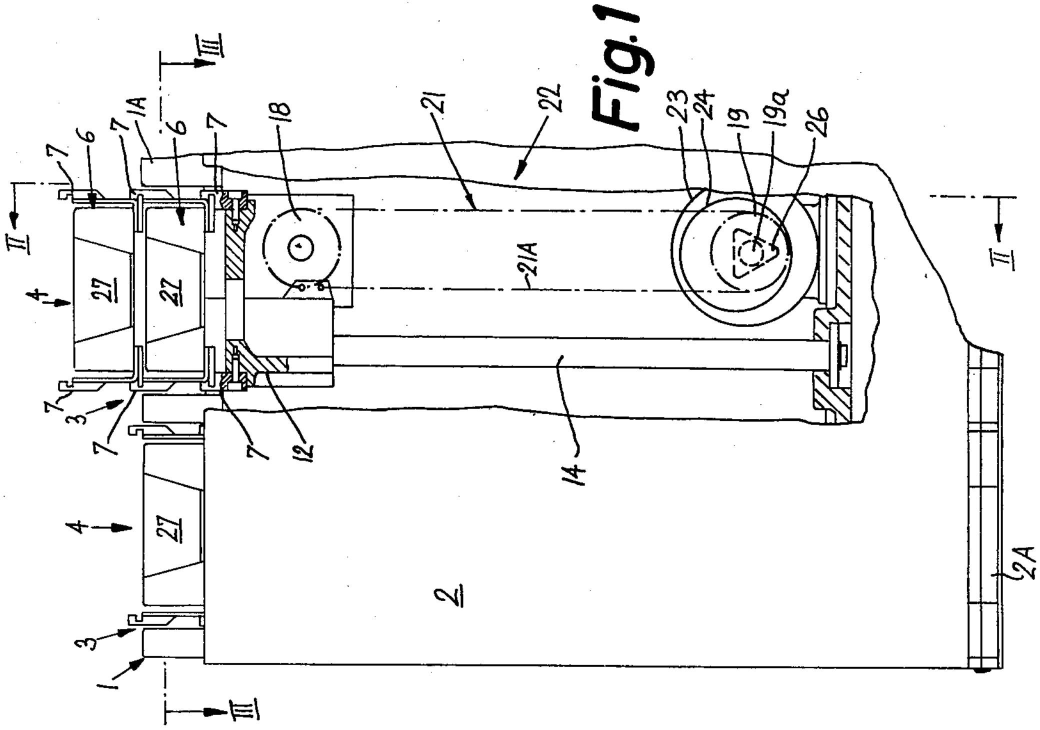
FIG. 1 is a fragmentary front elevational view of a safe which embodies the invention, certain parts of the safe being shown in vertical section.
Figure 3:
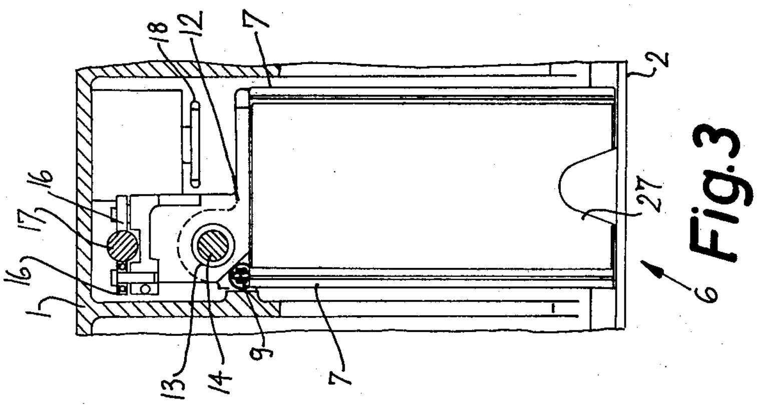
FIG. 3 is a horizontal sectional view as seen in the direction of arrows from the line III—III of FIG. 1.
Figure 2:
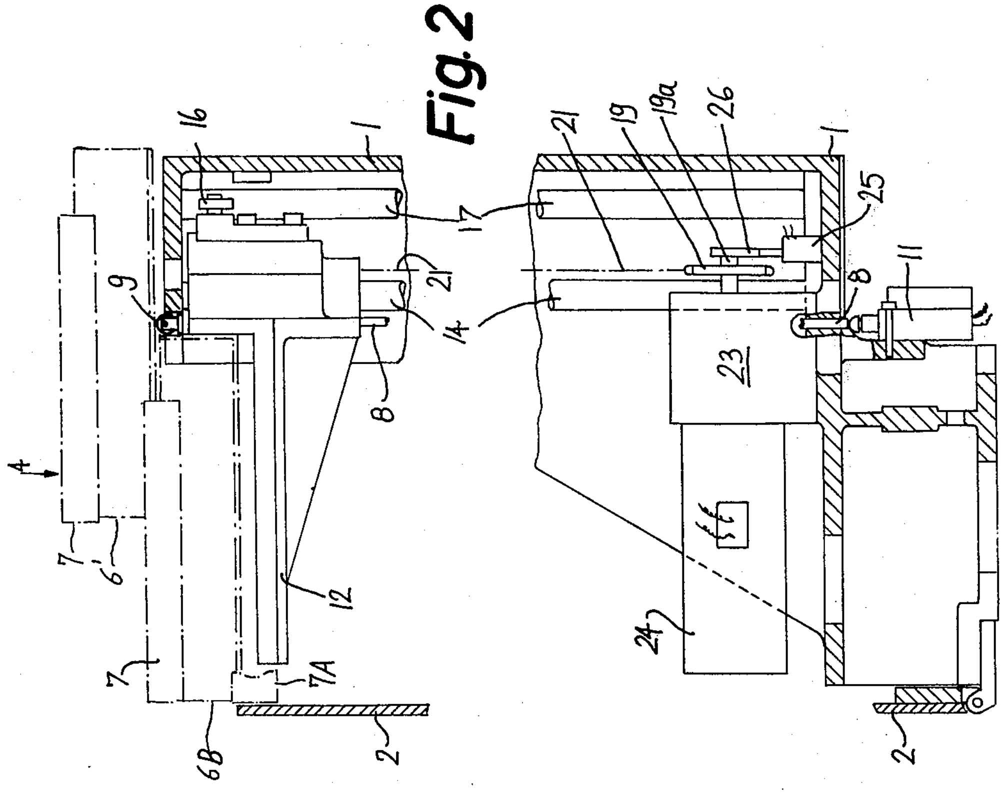
FIG. 2 is a vertical sectional view as seen in the direction of arrows from the line II—II of FIG. 1.

The safe which is shown in FIGS. 1 to 3 comprises a reinforced or armored metallic housing 1 having a pivotable front panel or door 2 which is normally held in closed and locked position. The horizontal hinge for the door 2 is shown at 2A. The key for the lock (not shown) which secures the door 2 in closed position is not available to the employees, e.g., to cashiers or tellers in a commercial or savings bank. The top portion 1A of the housing 1 is formed with a row of openings 3 each of which can receive and normally receives a portion of a composite container 4. For example, the top portion 1A can have five openings 3 for an equal number of composite containers 4 which serve for storage of stacks of bills. It is assumed that the denominations of bills in each of the five containers 4 are different. For example, the containers 4 can respectively store stacks of 5-dollar, 10-dollar, 20-dollar, 50-dollar and 100-dollar bills. If the institution handles foreign currency including currency of the Federal Republic Germany, the five containers can be respectively used to store 10-Mark, 20-Mark, 50-Mark, 100-Mark and 500-Mark bills. Each container 4 includes an upright stack or row of discrete smaller receptacles or drawers 6 at least some of which are reciprocably mounted in a suitable skeleton frame of the respective container. Such skeleton frame includes horizontal guide means in the form of tracks or rails 7. The drawers 6 are reciprocable in directions at right angles to the plane of the closed and locked door 2. At least the uppermost drawer 6 of each composite container 4 is located at a level above the top surface of the housing 1 and can be pushed back, i.e., in a direction to the right, as viewed in FIG. 2, so as to move out of vertical alinement with the drawer therebelow. The drawer 6 which is located at a level above the respective opening 3 and is held in the rear end position (see the drawer 6' in FIG. 2) engages and depresses a roller 9 at the upper end of a vertically reciprocable rod 8 which constitutes a trip for an electric switch 11 (see FIG. 2). A discrete switch 11, a discrete rod 8 and a discrete roller 9 is provided for each of the composite containers 4. The switches 11 are mounted at the rear side of the housing 1 close to the floor so that they are not accessible and can be actuated only through the medium of the respective rods 8. The number of drawers 6 in each composite container 4 can be selected at will. For example, each container 4 may comprise six superimposed drawers 6.

The track 7A for the lowermost drawer 6 of each composite container 4 is attached to a carrier or holder 12. The carrier 12 (one such carrier is provided for each composite container 4) has a bearing sleeve 13 which is guided by and is slidable along an upright tie rod or column 14 which is installed in the interior of the housing 1. FIG. 2 shows that the columns 14 are adjacent to the rear wall of the housing 1. Each carrier 12 is provided with a pair of roller followers 16 which track an upright guide post 17. The posts 17 are parallel to the columns 14 and are installed in the interior of the housing 1. The carriers 12 and the composite containers 4 thereon form part of discrete conveyors 22 each of which further includes two sprocket wheels 18, 19 and an endless flexible element 21, preferably a link chain having one or more of its links secured to the respective carrier 12. These conveyors serve to move the respective composite containers 4 up or down, depending upon whether the employee who is sitting or standing next to the safe desires to conceal a filled drawer 6 or to lift a filled drawer into a position of register with the respective opening 3.

The horizontal shafts for the sprocket wheels 18 and 19 are mounted in the interior of the housing 1. The shafts **19*a* for the lower sprocket wheels 19 receive torque from discrete self-locking worm drives 23 whose input elements receive torque from discrete prime movers 24. In the illustrated embodiment, each prime mover 24 is a reversible electric motor. Owing to the self-locking nature of worm drives 23, the chains 21 of the conveyors 22 can be set in motion only in response to starting of the respective prime movers 24. Thus, the worm drives 23 can be said to constitute means for blocking indexing movements of the respective conveyors 22 whenever the associated prime movers 24** are idle.

Each shaft **19*a* further carries a suitably configurated arresting cam 26 which has one or more lobes 26*a* and constitutes a means for limiting the extent of forward or backward movement of the respective conveyor 22 in response to starting of the associated prime mover 24. The lobe or lobes 26*a* of the cams 26 can actuate discrete electric switches 25, i.e., one such switch is provided for each of the conveyors 22**.

Each drawer 6 contains a tray or box 27 for storage of stacks of bills. The trays 27 are preferably configurated in such a way that the cross-sectional area of their internal spaces approximates or only slightly exceeds the size of the respective bills. In addition, the trays can be provided with lateral and/or front recesses or cutouts to enable a teller to rapidly grasp a desired number of bills during casing of a check or in the course of another transaction.

The trays 27 can be withdrawn from the respective drawers 6 by moving them toward the observer of FIG. 1; however, this is possible only in connection with those trays which are received in drawers 6 located in the corresponding openings 3 or above such openings; the trays therebelow can be withdrawn only on opening of the door 2 or by starting the respective prime mover 24 in a direction to move the associated carrier 12 upwardly. The key for the lock on the door 2 is preferably stored in a suitable key box which is protected by a timer-operated lock and is mounted in or on a wall of the institution. In other words, the key for unlocking of the door 2 is not available to the person who is in charge of handling money in the safe of the present invention.

Figure 4:
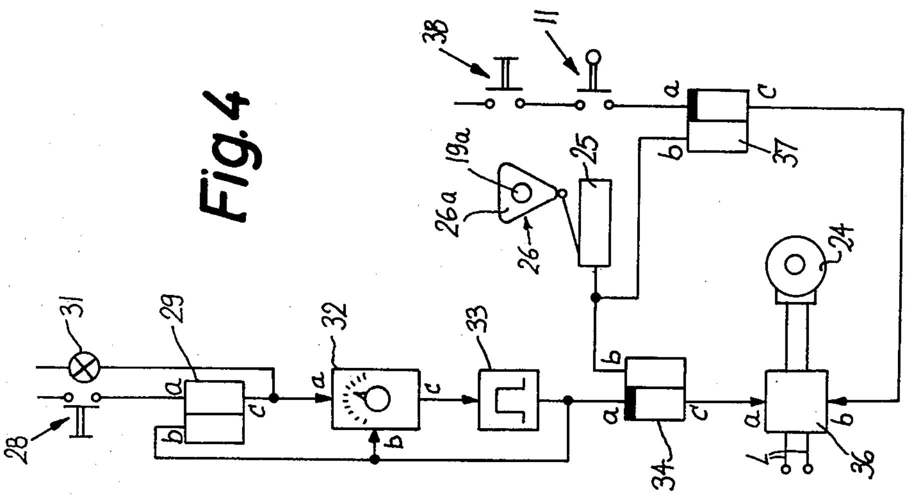
FIG. 4 is a circuit diagram of the control system for one unit of the improved safe.

FIG. 4 shows the heretofore described and certain additional components of the control system for one of the conveyors 22. The control system further includes a starting switch 28 which is actuatable by the teller to transmit a signal to the setting input a of a signal-storing flip-flop circuit 29. The starting switch 28 is preferably mounted on a suitable bracket (not shown) which is secured to the housing 1. The output c of the flip-flop circuit 29 transmits signals in response to transmission of a signal to its input a; such output signals are transmitted to a light-emitting device 31 and to the input a of an adjustable timer clock 32 constituting a time-delay device. The output c of the timer 32 transmits signals to the dominant setting input a of a second flip-flop circuit 34 by way of a pulse shaper 33. Such signals are further transmitted to the erasing inputs b of the flip-flop circuit 29 and timer 32. The erasing input b of the flip-flop circuit 34 is connected with the corresponding electric switch 25, i.e., the signal at the output c of the flip-flop circuit 34 is erased when one of the three lobes **26*a* on the corresponding arresting cam 26 closes the normally open switch 25. The output c of the flip-flop circuit 34 is connected with the input a of a control circuit 36 for the reversible electric motor 24. The leads L connect the control circuit 36 with a source of electrical energy. The construction of the control circuit 36 is known per se. When the input a of the control circuit 36 receives a signal from the flip-flop circuit 34, it causes the motor 24 to drive the respective conveyor 22 in a direction to raise a filled drawer 6 into the opening 3, i.e., to enable the teller to gain access to bills which were confined in the interior of the housing 1**.

The switch 25 is further connected with the erasing input b of a third flip-flop circuit 37 whose output c transmits a signal to the input b of the control circuit 36 when the motor 24 is to be operated in reverse, i.e., in a direction to lower a filled drawer 6 into the interior of the housing 1. The dominant input a of the flip-flop circuit 37 receives signals on closing of the aforementioned switch 11 and on closing of a further starting switch 38 which is in series with the switch 11 and can be actuated by the teller.

The extent of indexing movement of a conveyor 22 in either direction equals or approximates the height of a drawer 6 plus the distance between two neighboring drawers.

The operation:

When the institution is closed, the trays 27 with bills therein are stored in the main vault of the institution. Prior to opening of the institution to members of the public, the key for the door 2 is removed from its box and the drawers 6 of the composite containers 4 are loaded with trays 27 each containing a supply of bills in the respective denominations. One or more drawers 6 at the top of each conveyor 22 receive empty trays 27. The door 2 is thereupon closed and locked, and the key for the door lock is returned to and locked in its box. It is assumed that the drawers 6 which are located in the openings 3 contain trays 27 which are filled with bills, and that the drawers 6 thereabove (see the drawer 6' in FIG. 2) contain empty trays 27. Such drawers are pushed rearwardly so that they depress the respective rods 8 which open the associated switches 11 (see the open switch 11 in FIG. 4). The timers 32 are set to transmit the incoming signals (from the outputs c of the respective flip-flop circuits 29) with a desired delay (e.g., with a delay of between one minute and five minutes, depending on the denominations of bills in the respective trays 27).

If the teller notes that the supply of bills in a tray 27 which is in register with the corresponding opening 3 is about to be exhausted, the teller actuates the corresponding starting switch 28 to transmit a signal to the input a of the associated flip-flop circuit 29. The device 31 emits a visible signal to indicate that the selected conveyor 22 is about to be set in motion. The input a of the timer 32 receives a signal simultaneously with actuation of the light-emitting device 31, and its output c transmits a signal with a selected delay to erase the signals at the outputs c of the flip-flop circuit 29 and timer 32 as well as to cause the flip-flop circuit 34 to transmit a signal to the input a of the control circuit 36 which starts the prime mover 24 in a direction to lift the uppermost filled tray 27 into register with the respective opening 3. The light-emitting device 31 is turned off when the prime mover 24 begins to drive the conveyor 22, and the timer 32 is reset to zero.

Upward movement of the left-hand stretch or reach 21A of the chain 21, as viewed in FIG. 1, is terminated when the shaft **19*a* is rotated (clockwise) through 120 degrees. The oncoming lobe 26*a* of the arresting cam 26 then closes the switch 25 which transmits a signal to the erasing input b of the flip-flop circuit 34 to thereby arrest the prime mover 24 via control circuit 36. This takes place when a drawer 6 containing a tray 27 which is filled with bills is located in a position of register with the corresponding opening 3**.

As the drawers 6 of a composite container 4 move upwardly, the drawer 6' which was disposed at a level above the respective roller 9 and has held the rod 8 in depressed position rises above and away from the roller 9 so that the corresponding switch 11 is permitted to close. Since the lifting of a composite container 4 results in the placing of a second drawer 6 with an empty tray therein at the level of the drawer 6' shown in FIG. 2, the teller pushes such second drawer rearwardly to again open the switch 11 via roller 9 and rod 8. The drawer 6 which has been lifted to the level of the drawer 6' in FIG. 2 need not be immediately moved above the respective rod 8. Thus, if the tray 27 in such drawer still contains some bills, the drawer 6 is held in the front end position (above the opening 3) and is pushed back only when the respective tray 27 is empty.

If the teller must hand out (or anticipate to hand out) a large number of bills of a particular denomination, the teller temporarily closes the starting switch 28 as soon as the prime mover 24 comes to a standstill so that the respective conveyor 22 is started again and lifts a further drawer with a tray 27 containing a supply of bills into a position of register with the respective opening 3. Such indexing of the conveyor 22 takes place with a delay which is determined by adjustment of the respective timer 32.

In the event of a robbery, the teller can immediately hand over only those bills which are located in the accessible drawers 6 while the majority of bills remain safely confined in the interior of the armored and locked housing 1. Threatening of the teller is to no avail because the teller cannot accelerate the procedure which must be followed in order to gain access to additional bills, i.e., the teller can follow a perpetrator's instructions to actuate the starting switches 28 of all five units; however, the perpetrator must wait until the respective timers 32 transmit signals to start the associated conveyors 22. Thus, losses which are incurred by the institution as a result of a robbery are but a small fraction of losses which would be incurred if the perpetrator or perpetrators were in a position to compel the teller or tellers to hand over all of the bills which are confined in the housing 1.

If the number of bills of a given denomination increases so that the tray 27 behind the corresponding opening 3 is filled with bills, the teller retracts the empty drawer 6 from the position 6' to a position above the corresponding opening 3 whereby the switch 11 closes. The teller thereupon closes the starting switch 38 to thereby transmit a signal to the input a of the flip-flop circuit 37 via closed switch 11. The output c of the circuit 37 transmits a signal to the input b of the control circuit 36 which starts the prime mover 24 in reverse whereby the drawer 6 with a filled tray 27 therein descends into the interior of the housing 1. The surplus of bills of the corresponding denomination is inserted into the tray 27 of the drawer 6 which has descended into the opening 3. As a rule, the starting switch 38 will be closed when the tray 27 in the drawer 6 which is held in the position 6' is at least partially filled with bills so that such bills are available as soon as the completely filled tray 27 has been lowered from the level of the opening 3 into the interior of the housing 1. Downward movement of drawers 6 is terminated by the arresting cam 26 which is then rotated in the opposite direction and the oncoming lobe 26a of this cam closes the switch 25 which transmits an erasing signal to the input b of the flip-flop circuit 37. In each instance, the worm drive 23 acts as a means for blocking the indexing movements of the respective conveyor 22 when the prime mover 24 is idle.

An important advantage of the improved safe is that the blocking means (worm drives 23) of all units are activated in automatic response to completion of indexing movements of the respective conveyors 22. Thus, reactivation of each and every worm drive 23 takes up a certain interval of time which must elapse upon actuation of the respective starting switch 28 before a conveyor 22 can be indexed in a direction to move a filled tray 27 into register with the respective opening 3. Consequently, a robber cannot compel a teller to immediately hand over a substantial sum of money because the teller, even a frightened teller, cannot accelerate the movement of loaded trays 27 into register with the respective openings 3. In the meantime, at least one of the tellers, or another employee, will find an opportunity to trigger a silent alarm and to thus alert the authorities that a robbery is in progress.

Another important advantage of the improved safe is that, in contrast to heretofore known safes with built-in time delay devices, the aforediscussed safety features do not interfere with the work of the cashier, teller or another employee who is in charge of withdrawing bills from and/or of introducing bills into the trays 27. This is due to the fact that each of the conveyors 22 comprises or is operatively connected with a composite container, i.e., with a stack or row of discrete receptacles or drawers 6. Consequently, the teller is always in a position to gain access to a reasonable amount of currency of each denomination (namely, to bills in the drawers 6 which register with the respective openings 3 as well as to bills, if any, in the drawers above the respective openings). However, the bulk of bills of each denomination is safely concealed in the housing 1, and such bills are accessible only in response to repeated actuation of the respective starting switches 28, always with a delay which depends on the selected adjustment of the corresponding time-delay devices 32. Since the devices 32 are adjustable independently of each other, the teller or his supervisor can select an appropriate delay for indexing of each and every conveyor 22 so as to protect the confined bills of larger denominations but to enable the teller to gain access to bills of lower denomination with necessary dispatch so that the teller can satisfy his or her customers without undue delay.

The starting switches 38 insure that the teller can operate the respective prime movers 24 without any delay. Thus, all that is necessary to introduce a filled tray 27 into the interior of the housing 1 is to return the drawer 6 (in the position 6') which maintains the respective switch 11 in open position back into a position of alinement with the drawers thereabove and/or therebelow, and to thereupon actuate the starting switch 38. The prime mover 24 causes the respective drawers 6 to move downwardly, and the incremental advance of the conveyor 22 is terminated by the corresponding arresting switch 25 as soon as the filled tray 27 which was previously held in a position of register with the corresponding opening 3 descends into the interior of the housing 1.

The openings 3 in the top portion 1A of the housing are preferably located at a level which is best suited to enable the teller to reach the bills in the accessible trays 27 with a minimum of effort. For example, the openings 3 can be located at the level of the top of an average table or desk.

The feature that only the lowermost drawer 6B of each composite container 4 is fixidly secured to the adjacent reach or stretch 21A of the corresponding chain 21 contributes to simplicity of the conveyor 22. The provision of tracks 7 for the drawers 6 above each lowermost drawer 6B (which is secured to its carrier 12) also facilitates the work of a teller because an empty drawer 6 (i.e., a drawer containing an empty tray 27) can be readily pushed back out of the way at a level above the respective opening 3. Analogously, a drawer 6 containing a filled tray 27 can be pushed back and held in reserve (especially if the tray contains bills of smaller denominations) for the event that a transaction will necessitate access to a relatively large number of bills. Since the drawers 6 of each composite container 4 are normally disposed one above the other, the contents of a drawer which registers with the corresponding opening 3 are more readily accessible if the drawer immediately above such drawer is pushed toward the rear end of the upper portion 1A of the housing 1.

The prime movers 24 are preferably small electric motors. This speed of the output elements of such motors is often too high for the purpose of insuring accurate alignment of consecutive drawers 6 of a composite container 4 with the respective opening 3 of the housing 1. Therefore, the torque-transmitting connection between each such motor and the corresponding shaft 19a comprises a step-down transmission (worm drive 23)

which performs several advantageous and important functions. Thus, the worm drive insures that the conveyor 22 is not indexed at a high speed as well as that the conveyor is blocked whenever the corresponding motor 24 is idle. The blocking action of a worm drive 23 can be terminated or interrupted solely by starting the respective motor, i.e., with a delay which is selected by adjustment of the corresponding time-delay device 32. This applies for indexing movements of the conveyor 22 in a direction to lift a filled tray 27 into register with the opening 3. As mentioned above, the movement of a motor 24 in the opposite direction (to conceal a filled tray 27 in the housing 1) can be initiated without any delay.

The setting of time-delay devices 32 will depend primarily on the denominations of bills in the corresponding trays 27. However, such setting can be chosen by simultaneous consideration of certain other factors, for example, the time of the day and/or the frequency at which a policeman or a police car inspects or observes the premises. Thus, the periods of delay will or can be shortened at noon or on a Friday when a bank or a similar institution anticipates a large influx of customers, but the delay will be made longer during other business hours when the teller anticipates that the supply of bills in a box 27 will last for a relatively long period of time. In each instance, the time-delay devices 32 can be constructed and assembled in such a way that a certain interval of minimum duration must elapse before the respective conveyor is set in motion in response to actuation of the associated starting switch 28. The intervals of minimum duration will be longer for those time-delay devices 32 which control the movements of drawers 6 for storage of large-denomination bills, e.g., 100-dollar, 500-dollar and 1000-dollar bills. This insures that a robber must content himself with a relatively small sum of money because he is highly unlikely to await repeated starting of a motor 24 which forms part of a conveyor for drawers containing bills of large donominations.

It is further clear that the adjustment of time-delay devices 32 will depend on the location of the institution. Thus, the selected delays will be longer if the location of the institution is such that the institution is likely to be the target of robbers or when, based on past experience, the institution expects frequent robberies. Moreover, an institution which is plagued by frequent robberies is unlikely to keep a large supply of and/or to hand out large numbers of bills of large denominations. Regardless of the selected delays for withdrawal of bills from the housing 1, the monies deposited by customers can be protected without delay becuase the actuation of a starting switch 38 entails practically instantaneous movement of the corresponding conveyor in a direction ro conceal a filled tray in the interior of the housing. The starting switches 38 can serve an additional important and desirable function. Thus, if a teller notes that a robbery is in progress and the teller is still in a position to conceal a certain amount of accessible bills, such person actuates one or more starting switches 38 to set the corresponding conveyors 22 in motion (without any delay) in a direction to confine filled trays 27 in the interior of the housing. In other words, and except when the teller is obviously in danger or when the teller fears that his action might provoke the criminal to inflict bodily harm to other employees and/or to customers, the teller can salvage at least some of the currency which is accessible when the criminal or criminals enter the premises.

The improved safe is susceptible of many additional modifications. For example, and depending on the requirements of a particular institution, the drawers 6 of two or more composite containers 4 can receive trays 27 with bills of identical denominations. Furthermore, the drawers 6 of one of the composite containers 4 may be made larger than the drawers of the other containers so as to receive relatively large trays 27 for bills of a particular denomination. The chain conveyors 22 can be replaced by turrent-shaped conveyors which are indexed by a control system similar or analogous to that shown in FIG. 4. Such turret-shaped conveyors can be indexed about horizontal or vertical axes.

It is further within the purview of the invention to construct each conveyor and the corresponding container as a separate entity or miniature safe. Such separate entities are readialy transportable to a location which is within reach of a teller. The separate entities can be secured to a suitable platform or to a wall to constitute a composite safe.

Still further, the improved safe can be simplified by providing it with a single conveyor or with a relatively small number of conveyors. For example, bills of smaller denominations can be stored in trays which are not movable into or out of register with discrete openings of the housing. Such openings are then provided solely for the drawers which contain trays for bills of larger denominations. The configuration of drawers which store bills of smaller denominations is preferably identical with that of drawers for more valuable bills. This insures that a criminal cannot distinguish between drawers which can be moved with a certain delay and the drawers which can be moved up or down without any delay, especially if the safe is located in a teller's cage which is not accessible to unauthorized persons.

Finally, it goes without saying that the improved safe can be used with equal advantage for storage of other valuables, for example, watches in different price ranges, jewelry in several price ranges, travellers' checks, endorsed checks and/or other negotiable papers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the claims.

What is claimed is:

1. A safe for storage of paper money or other valuables, comprising a housing having a first opening and at least one additional opening; a first indexible conveyor mounted in said housing and including a plurality of receptacles for storage of valuables therein, one of said receptacles being accessible via said first opening during each interval of dwell of said conveyor between successive indexing movements thereof; means for indexing said conveyor at the will of the operator, including operator-actuated means for starting said conveyor; means for blocking the indexing movements of said conveyor; time-delay means for deactivating said blocking means with a preselected delay following the actuation of said means; an additional conveyor having a plurality of additional receptacles and being indexible to place a different additional receptacle into register with said additional opening upon termination of each indexing movement of said additional conveyor; means for indexing said additional conveyor, including operator-actuated means for starting said additional conveyor; means for blocking the indexing movements of said additional conveyor; and time-delay means for deactivating said last mentioned blocking means with a preselected delay following the activation of said last mentioned starting means.

2. A safe as defined in claim 1, wherein at least said first mentioned time-delay means comprises an adjustable timer.

3. A safe as defined in claim 1, wherein the receptacles of at least said first conveyor form a row of neighboring receptacles and successive actuations of said first mentioned starting means entail the movement of successive receptacles of said row into register with said first opening, always with said first mentioned preselected delay.

4. A safe as defined in claim 3, wherein said neighboring receptacles of said row are designed and dimensioned to receive currency of one and the same denomination, and wherein said first mentioned blocking means includes means for preventing the indexing of said first conveyor in automatic response to completion of each indexing movement of said first conveyor.

5. A safe as defined in claim 1, further comprising arresting means for automatically terminating the indexing movement of said first conveyor when the first conveyor completes a predetermined incremental advance in response to actuation of said first mentioned starting means and after elapse of said first mentioned preselected delay.

6. A safe as defined in claim 5, wherein said first conveyor comprises a prime mover and said arresting means includes means for effecting disconnection of said prime mover from a source of energy when said first conveyor completes said incremental advance.

7. A safe as defined in claim 1, wherein said first conveyor is indexible in a first direction in response to actuation of said first mentioned starting means to thereby move successive valuables-containing receptacles of said first conveyor into register with said first opening and in the opposite direction, and further comprising second starting means operative to effect undelayed indexing of said first conveyor in said opposite direction.

8. A safe as defined in claim 1, wherein the receptacles of said first conveyor form a vertical stack and said housing has a top portion, said first opening being provided in said top portion of said housing.

9. A safe as defined in claim 8, wherein the outline of said first opening is complementary to the outlines of the receptacles of said first conveyor.

10. A safe as defined in claim 8, wherein the receptacles of said first conveyor include a lowermost receptacle and said first conveyor comprises a carrier supporting said lowermost receptacle.

11. A safe as defined in claim 1, wherein said first conveyor includes guide means movably supporting at least some of the respective receptacles so that each receptacle of said first conveyor is movable relative to the other receptacles of said first conveyor.

12. A safe as defined in claim 11, wherein the receptacles of said first conveyor are disposed one above the other and include a lowermost receptacle, said first conveyor including carrier means fixedly supporting said lowermost receptacle, the remaining receptacles of said stack being movable relative to each other and with respect to said lowermost receptacle.

13. A safe as defined in claim 1, wherein said first conveyor includes an endless flexible element having a substantially vertical stretch and a carrier secured to said vertical stretch, the receptacles of said first conveyor being disposed one above the other and including a lowermost receptacle secured to said carrier.

14. A safe as defined in claim 13, further comprising an upright tie rod in said housing, said carrier having a portion engaging with and being guided by said tie rod.

15. A safe as defined in claim 13, wherein said endless flexible element is a chain and said first conveyor further comprises an upper and a lower sprocket wheel in said housing, said chain being trained over said sprocket wheels.

16. A safe as defined in claim 1, wherein said first conveyor further comprises a prime mover and control means for setting said prime mover in motion in response to actuation of said first mentioned starting means and upon elapse of said first mentioned preselected delay.

17. A safe as defined in claim 16, wherein said prime mover includes a reversible motor which is started in one direction on actuation of said first mentioned starting means, and further comprising second starting means actuatable by the operator to start said prime mover in the opposite direction.

18. A safe as defined in claim 1, wherein said first mentioned blocking means includes a self-locking transmission.

19. A safe as defined in claim 18, wherein said transmission is a worm drive.

20. A safe as defined in claim 19, wherein said first conveyor includes a prime mover and means for moving the respective receptacles, said worm drive being interposed between said moving means and said prime mover and further comprising means for setting said prime mover in motion in response to actuation of said first mentioned starting means and after elapse of said first mentioned predetermined delay.

21. A safe for storage of paper money or other valuables, comprising a housing having a first opening and at least one additional opening; an indexible conveyor mounted in said housing and including a plurality of receptacles for storage of valuables therein, one of said receptacles being accessible via said first opening during each interval of dwell of said conveyor between successive indexing movements thereof; means for indexing said conveyor at the will of the operator, including operator-actuated means for starting said conveyor; means for blocking the indexing movements of said conveyor; time-delay means for deactivating said blocking means with a preselected delay following the actuation of said starting means; additional indexible conveyor means with receptacles movable into register with said additional opening in response to indexing of said additional conveyor means; additional starting means for said additional conveyor means; additional blocking means for said additional conveyor means, and additional time-delay means for said additional blocking means, each of said time-delay means comprising a timer which is adjustable independently of the other time so that the delay with which said conveyor and said additional conveyor means are started in response to actuation of the respective starting means can be selected at will.

* * * * *